(12) United States Patent
Myers et al.

(10) Patent No.: US 12,196,951 B2
(45) Date of Patent: *Jan. 14, 2025

(54) OPTOMECHANICAL FIBER ACTUATOR

(71) Applicant: The Government of the United States of America, as represented by the Secretary of the Navy, Arlington, VA (US)

(72) Inventors: Jason D. Myers, Alexandria, VA (US); Jesse A. Frantz, Washington, DC (US); Jasbinder S. Sanghera, Ashburn, VA (US); Daniel Rhonehouse, Huntingtown, MD (US); Christopher Bardeen, Riverside, CA (US); Colin Baker, Alexandria, VA (US); Geoffrey Chin, Oakton, VA (US); Peter Alexander Morrison, Alexandria, VA (US)

(73) Assignees: The Government of the United States of America, as represented by the Secretary of the Navy, Arlington, VA (US); The Regents of the University of California, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/366,828

(22) Filed: Aug. 8, 2023

(65) Prior Publication Data

US 2024/0061238 A1 Feb. 22, 2024

Related U.S. Application Data

(63) Continuation-in-part of application No. 17/689,843, filed on Mar. 8, 2022, now Pat. No. 11,761,434.

(60) Provisional application No. 63/158,641, filed on Mar. 9, 2021.

(51) Int. Cl.
*G02B 26/10* (2006.01)

(52) U.S. Cl.
CPC ................. *G02B 26/103* (2013.01)

(58) Field of Classification Search
CPC .................................. G02B 26/103
See application file for complete search history.

(56) References Cited

U.S. PATENT DOCUMENTS

| 5,671,314 A | 9/1997 | Gregory et al. |
| 6,370,293 B1 * | 4/2002 | Emmerich ......... B29D 11/0075 |
| | | 385/115 |
| 2006/0088268 A1 * | 4/2006 | Nevo ................. G02B 26/0833 |
| | | 385/140 |

OTHER PUBLICATIONS

White et al., "A high frequency photodriven polymer oscillator," Soft Matter, 2008, vol. 4, pp. 1796-1798, 3 pages.
Ryu et al., "Photo-origami-Bending and folding polymers with light," Applied Physics Letters, 2012, vol. 100, 161908, 5 pages.
(Continued)

*Primary Examiner* — Donald L Raleigh
(74) *Attorney, Agent, or Firm* — US Naval Research Laboratory; Jorie L. Stroup (57) ABSTRACT

Systems and methods are provided for a mechanical actuator based on a fiber optic platform. A material that is configured to be activated by light is incorporated into an optical fiber that serves as both an actuator and a power delivery network. This platform is adaptable to different materials, types of motions, and length scales and allows for precise delivery of photons to the material.

20 Claims, 6 Drawing Sheets

(56) References Cited

OTHER PUBLICATIONS

Ware et al., "Voxelated liquid crystal elastomers," Science, 2015, vol. 347, Issue 6225, pp. 982-984, 4 pages.
Bian et al., "Optically activated cantilever using photomechanical effects in dye-doped polymer fibers," Journal of Optical Society of America B, 2006, vol. 23, Issue 4, pp. 697-708, 12 pages.
Dong et al., "Effects of Template and Molecular Nanostructure on the Performance of Organic-Inorganic Photomechanical Actuator Membranes," Advanced Functional Materials, 2020, vol. 30, 1902396, 9 pages.

\* cited by examiner

OPTOMECHANICAL FIBER ACTUATOR

CROSS-REFERENCE TO RELATED APPLICATIONS

This application claims the benefit of U.S. provisional application No. 63/158,641 filed on Mar. 9, 2021, and is a continuation-in-part of U.S. application Ser. No. 17/689,843 filed Mar. 8, 2022, the entirety of which applications are incorporated herein by reference.

FEDERALLY SPONSORED RESEARCH AND DEVELOPMENT

The United States Government has ownership rights in this invention. Licensing inquiries may be directed to Office of Technology Transfer, US Naval Research Laboratory, Code 1004, Washington, DC 20375, USA; +1.202.767.7230; techtran@nrl.navy.mil, referencing Navy Case No. 210168-US3.

BACKGROUND OF THE INVENTION

Conventional mechanical actuators are based on electrical motors. While they are certainly a mature and ubiquitous technology, they have limitations: motors are relatively heavy, bulky, require power delivery through metallic cables, and are not suitable to performing complex, bio-inspired motions. Thus, a different actuation mechanism would have advantages. One such candidate mechanical actuator is based on optomechanical materials that directly convert photons into mechanical work.

Optomechanical materials respond to illumination with a change in physical dimension, either by a phase change or by a molecular conformation change. There is interest in exploring the photochemistry, macroscopic alignment, crystallinity, etc., of a variety of materials, typically through incorporation of these materials into liquid crystal elastomers or on bulk materials or crystals. For example, it has been shown that by incorporating optomechanical materials into a matrix of porous aluminum oxide, strain may be generated. However, this configuration yields a very small activated volume due to strong absorption of actinic light, yielding a limited total response. In addition, large-scale, external flood illumination of a sample may be required. In an actual platform, such illumination is impractical because it will require electrical power delivery to a light source that is adjacent to the optomechanical actuator. This is undesirable from both a platform integration and an efficiency standpoint.

SUMMARY OF THE INVENTION

Systems and methods are provided for a mechanical actuator based on a fiber optic platform. In embodiments, a material that is configured to be activated by light is incorporated into an optical fiber that serves as both an actuator and a power delivery network. This platform is adaptable to different materials, types of motions, and length scales and allows for precise delivery of photons to the material.

Actuators are described herein. In embodiments, an actuator includes a first region configured to guide light from an optical source; a second region configured to scatter the guided light from the first region to a third region, the second region being proximate to the first region; and the third region comprising a first material configured to absorb the scattered light to create a mechanical response. In implementations, an actuator includes an optical region configured to guide light from a light source and at least one mechanical region proximate to the optical region including a material configured to absorb at least a portion of the light to create a mechanical response.

Systems are also described herein. In embodiments, a system includes a plurality of optical fibers. Each optical fiber comprises a first region configured to guide light from an optical source; a second region configured to scatter the guided light from the first region to a third region, the second region being proximate to the first region; and the third region comprising a first material configured to absorb the scattered light to create a mechanical response. In implementations, a system includes a plurality of optical fibers connected to a substrate, wherein each of the plurality of optical fibers includes: an optical region configured to guide light from a light source; and at least one mechanical region proximate to the optical region including a material configured to absorb at least a portion of the light to create a mechanical response.

Methods for fabricating an actuator are also described. In embodiments, a method includes forming a first region that is configured to guide light from an optical source; forming a second region that is configured to scatter the guided light from the first region to a third region, the second region being proximate to the first region; and forming the third region that comprises a first material configured to absorb the scattered light to create a mechanical response. In implementations, a method includes forming an optical region that is configured to guide light from a light source, and forming a mechanical region proximate to the optical region that includes a material configured to absorb the light to create a mechanical response. Further features and advantages of the invention, as well as the structure and operation of various embodiments are described in detail below with reference to the accompanying drawings.

DETAILED DESCRIPTION

Definitions

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, it is submitted that it is within the knowledge of one skilled in the art to effect such feature, structure, or characteristic in connection with other embodiments whether or not explicitly described.

In describing and claiming the disclosed embodiments, the following terminology will be used in accordance with the definition set forth below.

As used herein, the singular forms "a," "an," "the," and "said" do not preclude plural referents, unless the content clearly dictates otherwise.

As used herein, the term "and/or" includes any and all combinations of one or more of the associated listed items.

As used herein, the term "about" or "approximately" when used in conjunction with a stated numerical value or range denotes somewhat more or somewhat less than the stated value or range, to within a range of ±10% of that stated.

Terminology used herein should not be construed as being "means-plus-function" language unless the term "means" is expressly used in association therewith.

Overview

Light-responsive materials, such as optomechanical materials, respond to illumination with a change in physical dimension, either by a phase change (amorphous to crystalline, solid to liquid, etc.) or by a molecular conformation change (i.e., a cis- to trans-isomerization). The activating light may either be a specific wavelength (e.g., 532 nanometer) or a broad spectrum of light depending on the specific properties of the light-responsive material. With proper system design, the shape change may be exploited into mechanical motion. For example, azobenzene molecules that undergo a cis-to trans-isomerization may be incorporated into a liquid crystal elastomer matrix. By controlling the molecular alignment (director profile) of the liquid crystal assembly, large-scale mechanical response may be achieved when the structure is illuminated due to reorganization and shape change of azobenzene molecules.

Described herein are photon-driven mechanical actuators based on fiber optics. Embodiments described herein utilize a structured optical fiber to isolate the optical mode from a strongly absorbing photomechanical material, thereby providing a scattering matrix to direct light. This provides better control of location and amount of desired movement than what is achievable with current technology. Other advantages of these mechanical actuators include an interaction length that is greatly extended, an increase in total activated volume, and simple implementation as it is easy to incorporate the optical fiber into fiber optical distribution networks.

According to embodiments of the invention, the mechanical actuators may be configured in numerous ways and may have the following common features: (1) a first region that has a high index of refraction to guide light, (2) a second region proximate to the first region that interacts with that light and causes scattering, and (3) an optomechanical material integrated into the fiber geometry that absorbs the scattered light to create a mechanical response. Alternatively, mechanical actuators may include an optical fiber that acts as an optical region to both guide light from an optical source and direct light to a light-responsive material (e.g., optomechanical material) integrated into the optical fiber, which absorbs the light to create a mechanical response.

Figure 1:
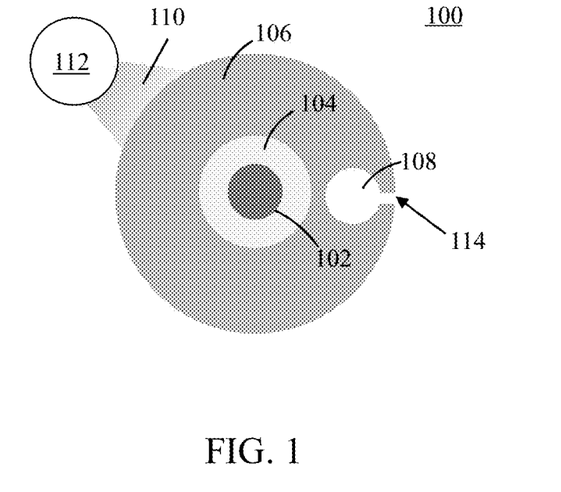
FIG. 1 depicts a cross sectional view of a fiber, according to an example embodiment.

FIG. 1 depicts a cross sectional view of a fiber 100, according to an example embodiment. Fiber 100 shown in FIG. 1 includes a first region 102, a second region 104, and a pore (mechanical region) 108 configured to accommodate a third region that includes a light-responsive material configured to absorb scattered light to create a mechanical response. Fiber 100 may further include a cladding 106.

In the example of FIG. 1, the first region 102 is configured to guide light 110 from an optical source 112. In an embodiment, a first region 102 may include a single mode core or a multimode core. A second region 104 is an optical region configured to scatter the guided light from the first region 102 to a light-responsive material (e.g., optomechanical material). In an embodiment, the fiber 100 is fabricated with the first region 102 and the second region 104, and a pore 108 is drilled or otherwise formed in the fiber 100. Post fabrication, the pore 108 may be infilled with an optomechanical material such as azobenzene (or derivatives) or diarylethene that undergoes a molecular transformation (e.g., cis- to trans-isomerization) upon illumination, thereby causing volumetric expansion due to molecular reorganization or structural phase changes. Alternatively, thin film inorganic materials such as germanium-antimony-tellurium (Ge—Sb—Te) compounds (e.g., $Ge_2Sb_2Te_2$), phase change materials (e.g., melting waxes) that absorb or release energy at phase transitions, or other organic and inorganic compounds may be used rather than the optomechanical material. In embodiments, the light-responsive material comprises one or more non-phase changing materials with different coefficients of thermal expansion (CTE) than the optical region of the fiber, such as low/zero and high CTE oxides. In implementations, the light-responsive material is in the form of a fiber, which is connected to an optical fiber to form an actuator.

In the example of FIG. 1, the pore 108 is shown as being circular with an open channel 114. However, the pore 108 may be formed with any geometry, with or without the open channel 114. Any suitable process or geometry appropriate for the selected material and/or application may be used to incorporate one or more of these materials into the fiber 100. In an embodiment, multiple pores may be formed to accommodate one or more types of optomechanical material, inorganic material or phase change material. See the exemplary embodiment in FIG. 8, for example.

Figure 7:
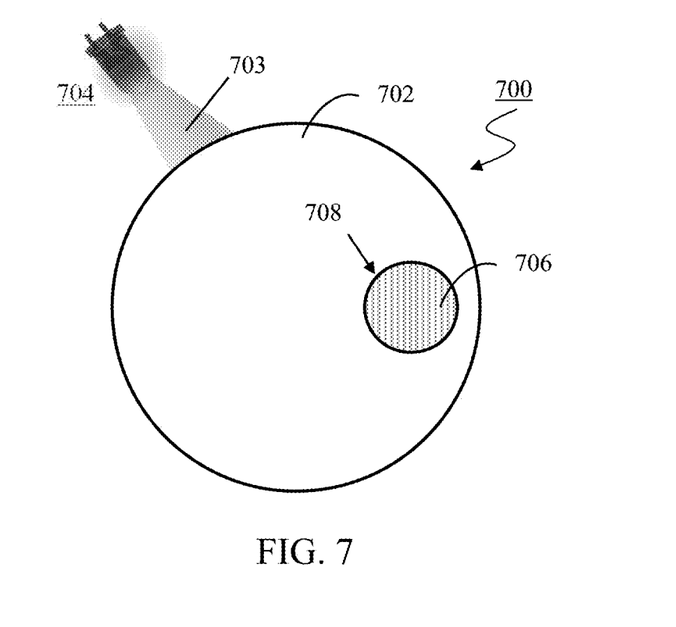
FIG. 7 depicts a cross sectional view of a fiber in accordance with additional embodiments of the invention.

Unlike other fibers that typically include non-scattering claddings around the cores, the second region 104 of the fiber 100 is designed to scatter light to a desired extent such that light may be controllably directed to a light-responsive material in the pore 108. Thus, the second region 104 may be formed with a different material than first region 102, with a refractive index difference between the two. Alternatively, the second region 104 may be the same material as the first region 102, albeit with a different effective index of refraction, for example, as provided by different process parameter(s) or mechanism(s) (e.g., introduction of bubbles), etc. Thus, in an embodiment, the second region 104 is an optical region designed to couple light to a light-responsive material within the pore 108 via an overlap of the optical mode and the light-responsive material, such that light may be absorbed by the light-responsive material to the desired extent. The desired mode overlap may also be created by controlling the geometries (and therefore mode distribution) of the first region 102, the second region 104, and the light-responsive material within the pore 108. In yet another embodiment, the second region 102 and the first region 102 may be integrated as a single region that guides light and couples the light to a light-responsive material (e.g., optomechanical material), as depicted in the example of FIG. 7 discussed below.

In an embodiment, the fiber 100 may be fabricated from a preform that includes a core (region 102 shown in FIG. 1), and a porous silica inner cladding (region 104 shown in FIG. 1) with a total outer dimension of approximately 250 micrometers (μm). The core may have a higher effective refractive index in comparison to the porous silica inner cladding. Other suitable materials, such as a polymer, another silicate glass, a non-oxide glass (e.g., fluoride or chalcogenide) or specialty oxide glass (e.g., tellurite, germanate, or phosphate) may also be used in place of silica. In this embodiment, the outer cladding (region 106 shown in FIG. 1) may be formed from silica and may contain a pore-and-slot configuration (e.g., the pore 108 shown in FIG. 1) that is infilled with a light-responsive material, through soaking in a solvent solution or melt. In this embodiment, the dimensions of the pore and slot may be 10-50 μm. For example, the dimension of the pore may be determined based on the penetration depth of the light-responsive material (e.g., two times the penetration depth for a circular pore) to enable the maximum activated volume. The fiber 100 may be more efficient when the activated volume of the light-responsive material is larger.

In an embodiment, the fiber 100 may include a plurality of longitudinal sections, wherein each section is configured to be different to allow for longitudinal variation in fiber properties. For example, the different sections may be spliced together. As another example, the fiber 100 may be formed with different processing conditions to change the scattering properties of the second region 104, resulting in different longitudinal sections with varying fiber properties. For example, during fiber draw, draw parameters may be varied to achieve longitudinal variation in the fiber 100. This variation may be used, for instance, to linearize the scatter for a high-loss fiber. In implementations, a fiber of the present invention (e.g., 100) may be rotated during the draw, thereby creating a helical pattern of an active light-responsive material incorporated therein along a length of the fiber.

In operation, light with an appropriate wavelength for activating the light-responsive materials (e.g., 375 nm, 532 nm, etc.) may be coupled into the core (region 102). When the light propagating within the core interacts with the porous silica inner cladding, it scatters and is absorbed by the light-responsive material within the pore 108, causing a molecular conformation change and introducing stress that causes the fiber 100 to deflect. In some cases, the fiber 100 may be jacketed after infill with a polymer cladding to provide protection and help contain the light-responsive material within the pore 108. In another embodiment, the pore-and-slot may be altered to promote a larger mechanical response or easier infill of the light-responsive material. In yet another embodiment, the infill material may be introduced after the polymer jacket is in place by any suitable means (e.g., pressure and/or vacuum).

Figure 2:
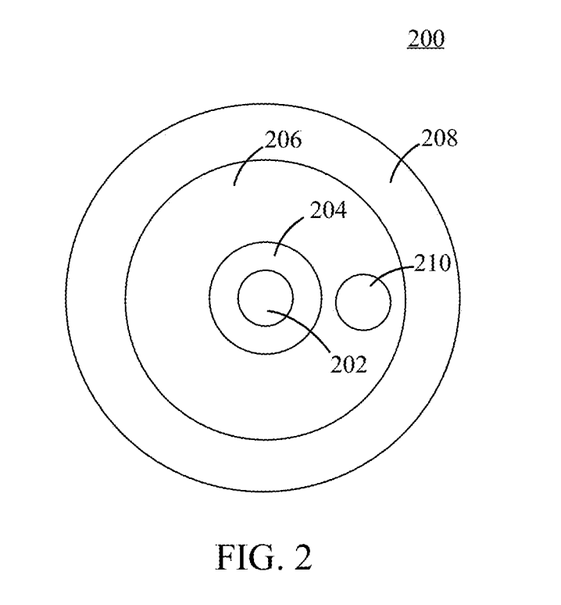
FIG. 2 depicts a cross sectional view of a fiber that is infilled and jacketed, according to an example embodiment.

FIG. 2 depicts a cross sectional view of a fiber 200 that is infilled and jacketed, according to an example embodiment. The fiber 200 shown in FIG. 2 is similar to the fiber 100 shown in FIG. 1, but with the addition of an outer jacket 208 and an infilled pore. The fiber 200 includes a core 202, a scattering inner cladding 204, a clear outer cladding 206, the outer jacket 208, and a light-responsive material 210 (infilled pore or mechanical region). In an embodiment, the scattering inner cladding 204 may be fully formed around the core 202, as shown in FIG. 2. In another embodiment, the scattering inner cladding 204 may be partially formed around the core 202 (e.g., a hemisphere or a rod formed between the core 202 and the light-responsive material 210).

Figure 3:
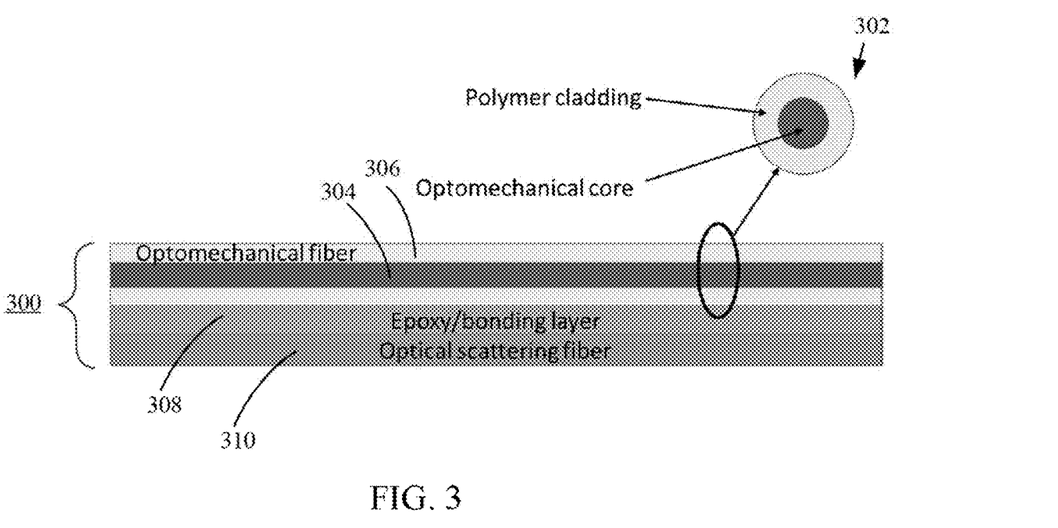
FIG. 3 depicts a cross sectional view of a bonded fiber assembly, according to an example embodiment.

FIG. 3 depicts cross sectional views of a bonded fiber assembly 300, according to an example embodiment. In FIG. 3, the bonded fiber assembly 300 is shown as a cross sectional view, along its length. As shown in FIG. 3, the bonded fiber assembly 300 includes an optomechanical fiber 302 coupled with an optical scattering fiber 310. In an embodiment, the optomechanical fiber 302 may include an optomechanical core 304 comprising a light-responsive material (optomechanical material or similar) and a polymer cladding 306. In this embodiment, the optomechanical fiber 302 may be coupled with the optical scattering fiber 310 via an epoxy or a bonding layer. In another embodiment, the optomechanical fiber 302 may be coupled with the optical scattering fiber 310 by a jacket that surrounds the two. In embodiments, one or more optomechanical fibers and/or one or more optical scattering fibers may be coupled together in any suitable manner and/or form. For example, they may be bundled together, coiled, or integrated/woven into flat, curved, or complex sheets.

Figure 4:
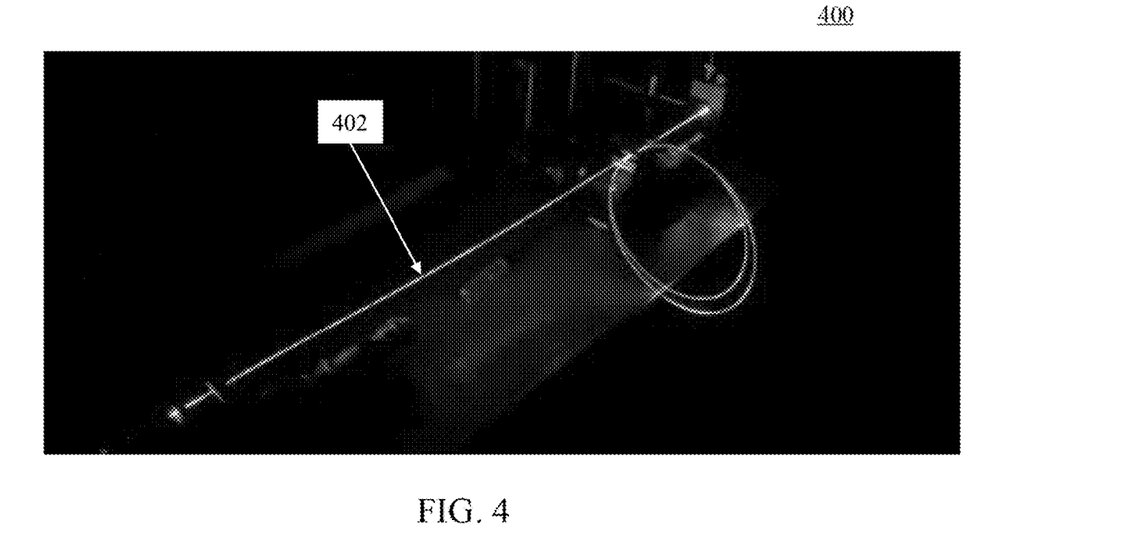
FIG. 4 depicts the fiber assembly of FIG. 3 being illuminated with light throughout its length, in accordance with embodiments of the invention.

FIG. 4 depicts the fiber assembly of FIG. 3 being illuminated with light throughout its length. In FIG. 4, the lighted fiber assembly 400 shown is approximately two meters in length. FIG. 4 depicts light (in light gray) being guided down a length 402 of the fiber assembly, and the infilled light-responsive material is being exposed to that light throughout the length of the fiber assembly. Thus, in this configuration, the light-responsive material has an activated volume that is much greater than in a configuration in which the light-responsive material is uniformly deposited in a matrix with external light illuminating a surface of the matrix and penetrating only the first few micrometers.

Figure 5A:
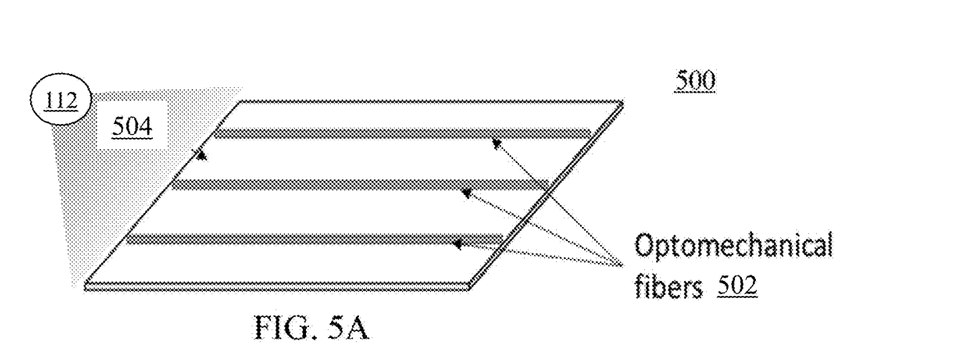
FIG. 5A depicts an optomechanical assembly, according to an example embodiment.

FIG. 5A depicts an optomechanical assembly 500, according to an example embodiment. As shown in FIG. 5A, the optomechanical assembly 500 includes a plurality of optomechanical fibers 502 (e.g., comprised of fibers 100 or 200) that are incorporated into a flexible substrate 504. Upon illumination of the optomechanical fibers 502, the substrate 504 may bend or exhibit some sort of mechanical response. In an embodiment, the optomechanical fibers 502 may be configured to be uniformly illuminated, for example, with a single optical source represented at 112. In another embodiment, the optomechanical fibers 500 may be configured to be non-uniformly or independently illuminated, for example, with multiple optical sources (not shown). An optical source 112 utilized in accordance with embodiments of the invention may be chosen based on the application. In implementations, an optical source 112 may include: a light emitting diode(s); a laser(s); broadband sources including but not limited to filament/incandescent, halogen, and fluorescent lights; and/or ambient light. In embodiments, the optical source 112 is configured to output actinic light with wavelengths of less than 400 nanometers (nm). In embodiments, the optical source 112 is configured to provide light directly to an exterior of an optomechanical fiber of the present invention (e.g., 502), or may be directed into the optical fiber via collimation optics, butt coupling, or other means. In implementations, light shone on an exterior of an optomechanical fiber of the present invention is uniform or spatially structured, such as through an aperture or mask, to create patterns or intensity differences across a length of the optomechanical fiber.

Figure 5B:
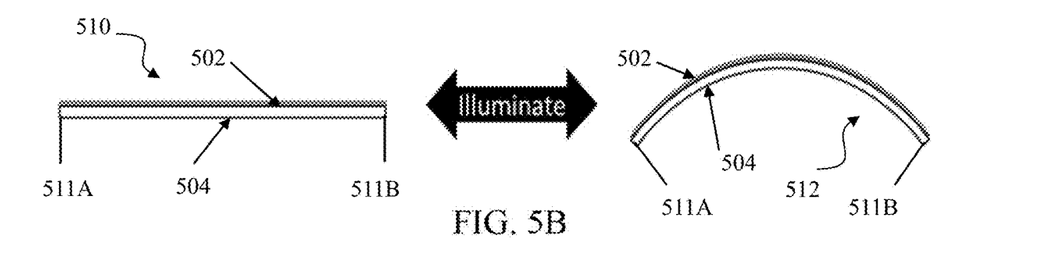
FIG. 5B illustrates an exemplary use scenario of the optomechanical assembly of FIG. 5B, in accordance with embodiments of the invention.

FIG. 5B depicts a side view of the optomechanical assembly 500 of FIG. 5A. In the exemplary use scenario depicted in FIG. 5B, a light from at least one optical source (e.g., optical source 112) is applied to one or more of the fibers 502 (e.g., by actuating the optical source 112 or otherwise bringing the light into contact with the one or more of the fibers 502), causing light-responsive material in the one or more of the fibers 502 to undergo a reaction that causes a mechanical response. In the example of FIG. 5B, the reaction causes the light-responsive material portion of the one or more of the fibers 502 to lengthen longitudinally, thereby causing the one or more of the fibers 502 to bend or flex. In the example of FIG. 5B, the fibers 502 are incorporated into or otherwise attached to the flexible substrate 504, such that the bending or flexing of the fibers 502 causes the flexible substrate 504 to transform from a first shape (e.g., a planar sheet) in a relaxed or non-activated state depicted at 510 to second shape in an activated state (e.g., a bent or flexed sheet) wherein opposing sides 511A, 511B of the flexible substrate 504 are brought closer to one another as depicted at 512.

Different flexible substrates 504 may be selected based on the particular application desired, and may include: polymers including but not limited to acrylates, carbonates, fluorinated polymers, olefins, vinyls, and cross-linked rubbers; metal foils including but not limited to gold, silver and aluminum; ultrathin glasses; textiles including woven and/or non-woven components; and layered substrates including polymers coated with thin films such as dielectrics and metals. In implementations, the substrate 504 may be utilized in deformable mirror applications (e.g., using metal foil and/or layered substrates).

In different embodiments, materials for the actuator(s) (e.g., optomechanical fibers 502) may be selected based on the application, and different regions of the actuator may be determined (e.g., using appropriate ratios) such that the regions are appropriately formed with the correct geometries and/or optical or material properties once the fiber is activated/drawn. While FIG. 5B depicts the flexible substrate 504 bending in one direction perpendicular to the longitudinal axis of the optomechanical fibers 502, it should be understood that different arrangements of optomechanical fibers 502 having different properties/characteristics may cause other kinds of mechanical responses such that an active state of the flexible substrate 504 may include multiple flexed points or bends.

Figure 6:
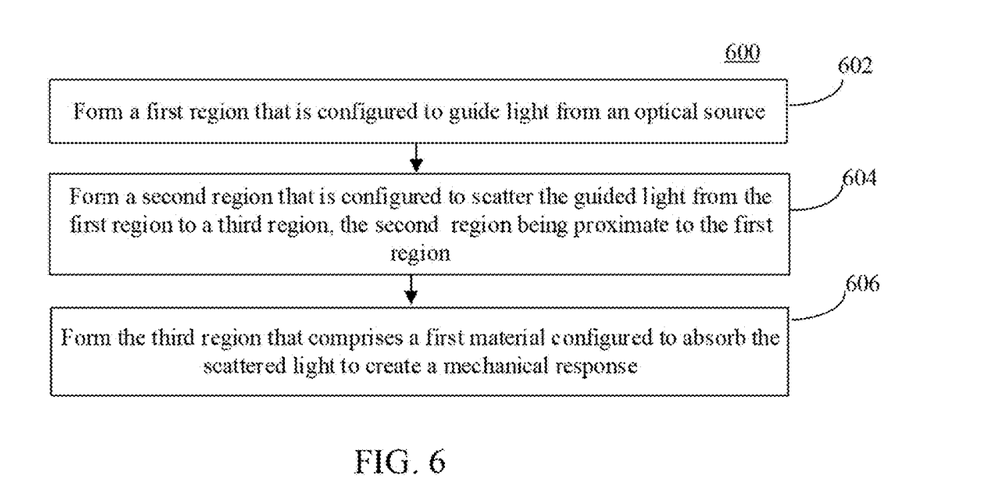
FIG. 6 depicts a flowchart for a method for fabricating an actuator, according to an example embodiment.

FIG. 6 depicts a flowchart for a method for fabricating an actuator, according to an example embodiment. In one embodiment, the actuator (e.g., optomechanical fibers 502) may include a waveguide or an optical fiber. Flowchart 600 depicted in FIG. 6 may include more or fewer steps and may be performed simultaneously and/or in a different order than shown. The flowchart 600 begins with step 602, in which a first region that is configured to guide light from an optical source is formed. In step 604, a second region that is configured to scatter the guided light from the first region to a third region is formed. In an embodiment, the second region may be proximate to the first region. Alternatively, the first and second region may be combined into a single optical region. In step 606, the mechanical region or third region may be formed. The third region may include a first material configured to absorb the scattered light to create a mechanical response. The first material may include one or more of a light-responsive material, an inorganic material, or a phase change material.

In embodiments, the material(s) for the actuator(s) (e.g., optomechanical fibers 502) may be selected based on the application and the different regions may be determined (e.g., using appropriate ratios) such that the regions are appropriately formed with the correct geometries and/or optical or material properties once the fiber is drawn. For example, a suitable combination of light-responsive material (s), optical source, and fiber optic materials may be selected based on desired properties, and the geometries and/or arrangement of the first, second and third regions may be determined based on the optical properties and desired mechanical response of the system.

In an example embodiment of an optical fiber, the third region (mechanical region) may be formed by fabricating the optical fiber (including a core and scattering cladding). A pore (e.g., pore 108) may be formed post fabrication and infilled with a light-responsive material (e.g., an optomechanical material or similar material).

In another example embodiment of an optical fiber, the third region (mechanical region) may be formed by incorporating the first material into another fiber and coupling that fiber to the optical scattering fiber such that they are in intimate (direct) contact. For example, a fiber preform may be made of a light-responsive material core and a polymer cladding with a similar melting or softening temperature to the light-responsive material. For instance, an optomechanical component of 1,2-Bis(2,4-dimethyl-5-phenyl-3-thienyl)-3,3,4,4,5,5-hexafluoro-1-cyclopentene and poly (methylmetharcylate) may be used. This preform may be heated and pulled into a fiber that is bonded to a separate optical fiber that is designed to scatter light (such as optical scattering fiber 310, shown in FIG. 3).

In yet another example embodiment of an optical fiber, the optical fiber may be fabricated by incorporating the first region, the second region, and the third region (mechanical region) into a polymer preform. The optical fiber may then be drawn or extruded from the preform such that the first region, the second region, and the third region are simultaneously formed in the optical fiber. For instance, a polymer preform may be constructed that includes a multimode core, a scattering inner cladding, and a clear outer cladding with a pore that is pre-filled and packed with a light-responsive material. This preform may be heated and pulled to create an optomechanical fiber that contains the light-responsive material without a need for post-pulling processing and infilling.

FIG. 7 depicts a cross sectional view of a fiber 700 (optomechanical fiber) in accordance with additional embodiments. In the embodiment of FIG. 7, the fiber 700 includes a first region (optical region) 702 configured to guide light 703 from an optical source 704 through a length of the fiber 700, and scatter the guided light from the first region 702 to a light-responsive material 706 in a second region (mechanical region) 708, wherein the light-responsive material 706 is configured to absorb the scattered light to create a mechanical response in the fiber 700. In embodiments, the first region 702 is comprised of a single material. In implementations, the first region 702 comprises poly (methyl methacrylate) (PMMA). Although depicted as a light emitting diode (LED), the optical source 704 may comprise a different source of light, and the present invention is not intended to be limited to particular optical source examples described herein.

In implementations, the second region 708 comprises a pore drilled or otherwise formed in the material of the first region 702 of the fiber 700 and infilled with the light-responsive material 706. In implementations, the light-responsive material 706 is in the form of an optomechanical material such as azobenzene (or derivatives) or diarylethene that undergoes a molecular transformation (e.g., cis- to trans-isomerization) upon illumination, thereby causing volumetric expansion due to molecular reorganization or structural phase changes. Alternatively, the light-responsive material 706 is in the form of one or more thin film inorganic materials such as Ge—Sb—Te compounds (e.g., $Ge_2Sb_2Te_2$), phase change materials that absorb or release energy at phase transitions (e.g., melting waxes), or other organic and inorganic compounds that cause a mechanical movement of the fiber 700 when exposed to light via the first region 702. In embodiments, the light-responsive material comprises one or more non-phase changing materials with different coefficients of thermal expansion (CTE) than the optical region of the fiber, such as low/zero and high CTE oxides. In FIG. 7, the second region 708 is shown as being circular, however, the second region 708 may be formed with any geometry, with or without an open channel (see, for example, the open channel 114 of FIG. 1). Any suitable process or geometry appropriate for the selected material and/or application may be used to incorporate one or more light-responsive materials into the fiber 700.

In embodiments, the second region 708 is designed to couple light to the light-responsive material 706 via an overlap of an optical mode wherein light is being channeled through the first region 702, and the light-responsive material 706, such that light may be absorbed by the light-responsive material 706 to an extent desired to affect a physical (mechanical) movement or reconfiguration of the fiber 700. The desired mode overlap may also be created by controlling the geometries (and therefore mode distribution) of the first region 702, and the light-responsive material 706. In embodiments, multiple pores may be formed to accommodate one or more types of light-responsive material, as depicted in FIG. 8.

Figure 8:
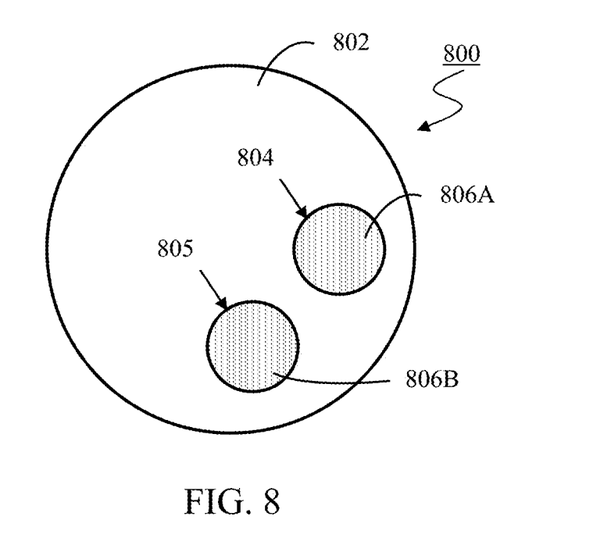
FIG. 8 depicts a cross sectional view of a fiber including multiple optomechanical regions in accordance with embodiments.

FIG. 8 depicts a cross sectional view of a fiber 800 including multiple mechanical regions 804 and 805 in accordance with embodiments of the invention. In implementations, multiple mechanical regions, represented by 804 and 805, are incorporated in an optical region 802 and include one more light-responsive materials 806A, 806B. The light-responsive materials 806A, 806B may include one or more of the light-responsive materials discussed herein. In accordance with embodiments of the invention, application of light to the optical region 802 causes at least a portion of the light to impinge on the light-responsive materials 806A, 806B, causing the light-responsive materials 806A, 806B to react and create a mechanical response (e.g., bending, flexing, curving) in the fiber 800.

Figure 9:
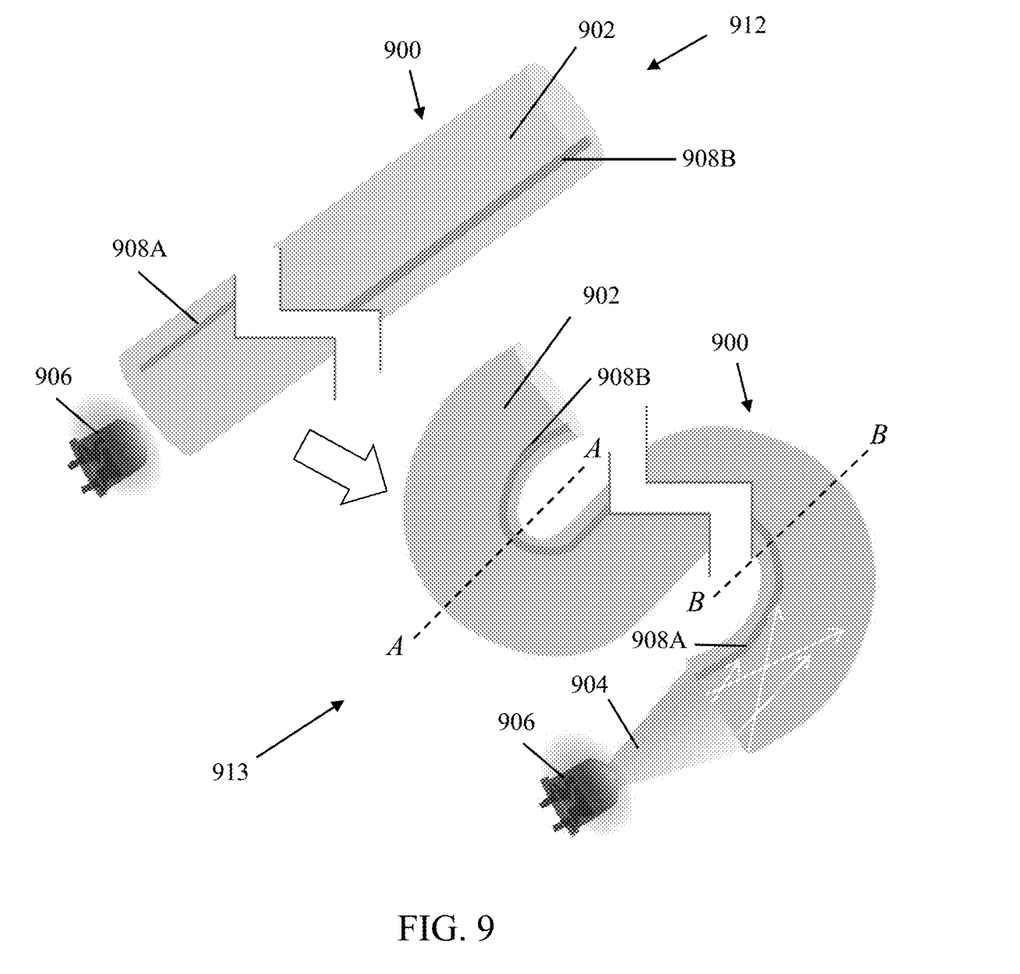
FIG. 9 depicts an exemplary mechanical response scenario in accordance with embodiments of the invention.

FIG. 9 depicts an exemplary mechanical response scenario in accordance with embodiments of the invention. In the example of FIG. 9, a fiber (optomechanical fiber) 900 comprises an optical fiber portion (optical region) 902 configured to guide light 904 from an optical or light source 906 through the fiber 900, such that at least a portion of the guided light within the optical fiber portion 902 impinges on first and second portions 908A, 908B (mechanical regions) of light-responsive material formed therein. Light-responsive materials within the first and second portions 908A, 908B may be the same material or different materials. In the example shown, activation of the light source 906 causes the light-responsive materials in the first and second portions 908A, 908B to change properties, which results in the fiber 900 bending around a first axis A and a second axis B, in opposing directions. Thus, actuating the light source 906 causes the fiber 900 to change from a first resting state indicated at 912, to an activated (flexed) state indicated at 913. It can be understood that a substrate (not shown) connected to one or more of the fiber 900 of FIG. 9 may likewise be changed from a resting state to a flexed state by actuating the light source 906.

Figure 10:
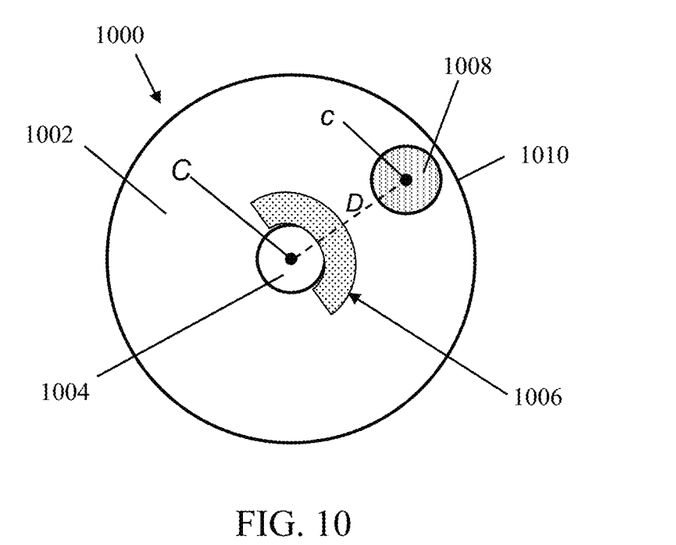
FIG. 10 illustrates a cross sectional view of a fiber in accordance with an embodiment of the invention

FIG. 10 illustrates a cross sectional view of a fiber (optomechanical fiber) 1000 in accordance with an embodiment of the invention. In the embodiment of FIG. 10, the fiber 1000 comprises an main body 1002 within which is formed an optical region or core 1004, a scattering layer 1006 formed around a portion of the core 1004, and a light-responsive material portion (mechanical region) 1008 positioned to absorb light emitting from the scattering layer 1006. The light-responsive material portion 1008 is shown positioned off-center along a side wall 1010 of the fiber 1000, with its center c located at a distance D from a center C of the fiber 1000. In implementations, light from an optical source (not shown) is guided through the core 1004, and at least a portion of the light is directed towards the light-responsive material portion 1008 by the scattering layer 1006. The scattering layer 1006 may comprise any material configured to scatter light in the direction of the light-responsive material portion 1008 in a manner that causes the light-responsive material in the light-responsive material portion 1008 to react and cause a mechanical response to the fiber 1000. It should be understood that the position of the light-responsive material portion 1008 within the fiber 1000 (e.g., changing distance D), may be changed to provide for different mechanical responses.

Figure 11:
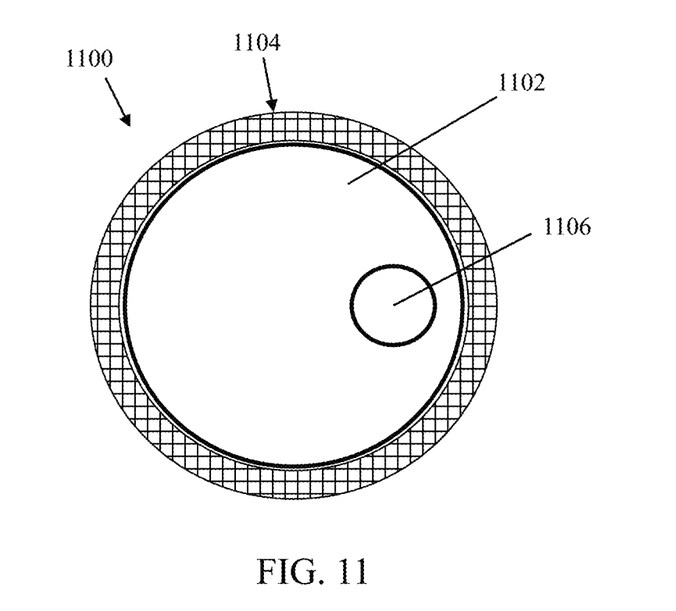
FIG. 11 illustrates a cross sectional view of a fiber in accordance with another embodiment of the invention.

FIG. 11 illustrates a cross sectional view of a fiber (optomechanical fiber) 1100 in accordance with another embodiment of the invention. In the embodiment of FIG. 11, the fiber 1100 comprises an optical region 1102 surrounded by a reflective outer jacket 1104. The fiber 1100 also includes a light-responsive material portion (mechanical region) 1106 therein, which is positioned off-center within the fiber 1100. In use, actuation of a light source (not shown) causes light to be guided through the optical region 1102. A portion of the light traveling through the optical region 1102 impinges on the reflective outer jacket 1104, and is reflected back through the optical region 1102. A portion of the light reflected within the optical region 1102 will impinge on light-responsive material within the light-responsive material portion 1106, causing the light-responsive material to react and cause a mechanical response in the fiber 1100.

In embodiments described herein, the optomechanical fibers may be jacketed and/or mirrored to better contain the scattered light and increase the efficiency of the actuators/systems. Similarly, in all cases, the optomechanical fiber may be designed to scatter light at a linear or non-linear rate as appropriate for a total length of the actuator and the desired mechanical actuation behavior of the actuator.

The techniques described herein provide the following advantages. Example embodiments integrate an optical delivery network and a mechanical actuator in a compact and lightweight platform, suitable for integration into different surfaces and assemblies. The optomechanical fiber actuators described herein are compatible with a number of different optomechanical materials, actuator designs, and wavelengths of light. The actuators are configured to make efficient use of optical power by precisely delivering it to the optomechanical material and, by jacketing or mirroring the outside of the fiber, preventing light leakage and loss. In addition, the techniques described herein leverage the substantial maturity of optical fiber technology for ready integration with light sources and optical distribution components.

In addition, optomechanical actuation systems have the benefits of being robust, lightweight, and corrosion resistant compared to copper cables and motors. In addition, there are many applications for the optomechanical actuators described herein.

Conclusion

While various embodiments of the disclosed subject matter have been described above, it should be understood that they have been presented by way of example only, and not limitation. Various modifications and variations are possible without departing from the spirit and scope of the described embodiments. Accordingly, the breadth and scope of the disclosed subject matter should not be limited by any of the above-described exemplary embodiments.

What is claimed is:

1. An actuator, comprising:
    an optical region configured to guide light from a light source, the optical region comprising an optical fiber; and
    at least one mechanical region proximate to the optical region and formed within the optical fiber and comprising a material configured to absorb at least a portion of the light to create a mechanical response.

2. The actuator of claim 1, wherein the material is selected from the group consisting of: an optomechanical material, an inorganic material, a phase change material, and a non-phase changing material having a different coefficient of thermal expansion than the optical region.

3. The actuator of claim 1, wherein the the at least one mechanical region is formed off-center within the optical fiber.

4. The actuator of claim 1, wherein the at least one mechanical region comprises multiple mechanical regions.

5. The actuator of claim 4, wherein the multiple mechanical regions cause the actuator to bend along at least a first axis and a second axis.

6. The actuator of claim 5, wherein the multiple mechanical regions each comprise a different material.

7. A system, comprising:
    a plurality of optical fibers connected to a substrate, wherein each of the plurality of optical fibers comprises:
        an optical region configured to guide light from at least one light source; and
        at least one mechanical region formed within a respective one of the plurality of optical fibers proximate to the optical region and comprising a material configured to absorb at least a portion of the light to create a mechanical response.

8. The system of claim 7, wherein the substrate comprises a flexible substrate selected from the group consisting of: polymers; metal foils; ultrathin glasses; textiles; and layered substrates.

9. The system of claim 7, wherein the plurality of optical fibers is configured on the substrate to be uniformly illuminated by the at least one light source.

10. The system of claim 7, further comprising the at least one light source configured to illuminate at least one of the plurality of optical fibers.

11. The system of claim 7, wherein the at least one light source comprises multiple light sources, and wherein each of the plurality of optical fibers is configured to be independently illuminated by respective light sources of the multiple light sources.

12. The system of claim 7, wherein each of the plurality of optical fibers comprises multiple mechanical regions.

13. The system of claim 7, wherein the multiple mechanical regions are configured to cause the substrate to bend along at least a first axis and a second axis when the at least one light source is actuated.

14. A method for fabricating an actuator, the method comprising:
    forming an optical region that is configured to guide light from a light source; and
    forming a mechanical region proximate to the optical region that comprises a material configured to absorb the light to create a mechanical response,
    wherein the optical region comprises an optical fiber including the mechanical region formed therein.

15. The method of claim 14, further comprising:
    forming a second mechanical region within the optical fiber, wherein the mechanical region and the second mechanical region cause the actuator to bend along at least a first axis and a second axis.

16. The method of claim 14, wherein the forming the mechanical region comprises infilling the material into a pore formed in the optical region.

17. The method of claim 14, wherein the forming the mechanical region comprises
    incorporating the material into a fiber; and
    coupling the fiber to the optical region such that they are in direct contact.

18. A method for fabricating an actuator, the method comprising:
    forming an optical region that is configured to guide light from a light source; and
    forming at least one mechanical region proximate to the optical region that comprises a material configured to absorb the light to create a mechanical response by:
        incorporating the optical region and the at least one mechanical region into a polymer preform for an optical fiber; and
        drawing or extruding the actuator from the preform such that the optical region and the at least one mechanical region are simultaneously formed in the actuator.

19. The method of claim 18, wherein the at least one mechanical region comprises a first mechanical region and a second mechanical region.

20. The method of claim 18, wherein the at least one mechanical region is formed off-center within the actuator.

* * * * *